United States Patent [19]

Sugata

[11] Patent Number: 5,070,592
[45] Date of Patent: Dec. 10, 1991

[54] SPINDLE UNIT OF A MACHINE TOOL IN WHICH TOOLS CHANGING IS AVAILABLE

[75] Inventor: Shinsuke Sugata, Fukuyama, Japan

[73] Assignee: Hokoku Machinery Co. Ltd., Japan

[21] Appl. No.: 587,126

[22] Filed: Sep. 24, 1990

[30] Foreign Application Priority Data

Sep. 22, 1989 [JP] Japan .................................. 1-246758

[51] Int. Cl.⁵ .......................... B23C 5/26; B23Q 3/157
[52] U.S. Cl. ......................................... 29/568; 279/75; 409/233
[58] Field of Search .................. 29/568; 409/231, 232, 409/233; 279/22, 30, 75

[56] References Cited

U.S. PATENT DOCUMENTS

| | | | |
|---|---|---|---|
| 4,122,755 | 10/1978 | Johnson | 409/233 |
| 4,745,673 | 5/1988 | Araki et al. | 409/233 |
| 4,817,267 | 4/1989 | Hitomi | 409/233 |

FOREIGN PATENT DOCUMENTS

| | | | |
|---|---|---|---|
| 659294 | 4/1979 | U.S.S.R. | 409/233 |
| 859051 | 8/1981 | U.S.S.R. | 409/232 |

Primary Examiner—Daniel W. Howell
Attorney, Agent, or Firm—William A. Drucker

[57] ABSTRACT

The present invention relates to a spindle unit of a machine tool in which tools changing is available and especially relates to a spindle unit by which a tool in a tool holder can be quickly and safely clamped and unclamped. This spindle unit is characterized in that an operating hole along with the centerline axis of a rotary spindle is provided therein for fixing (or clamping) a tool, a draw bar furnished with a cylindrical body along with the inner circumferential face of the operating hole is provided therein, the lower portion of the cylindrical body is formed on the inclination face of a wedge body, and a tool is clamped by guiding a ball by which the pull stud of a tool holder is engaged, along with the inclination of the inclination face of the wedge body, that is, by movement of the ball toward the center of the spindle, and is unclamped by the reverse movement of the ball.

2 Claims, 6 Drawing Sheets

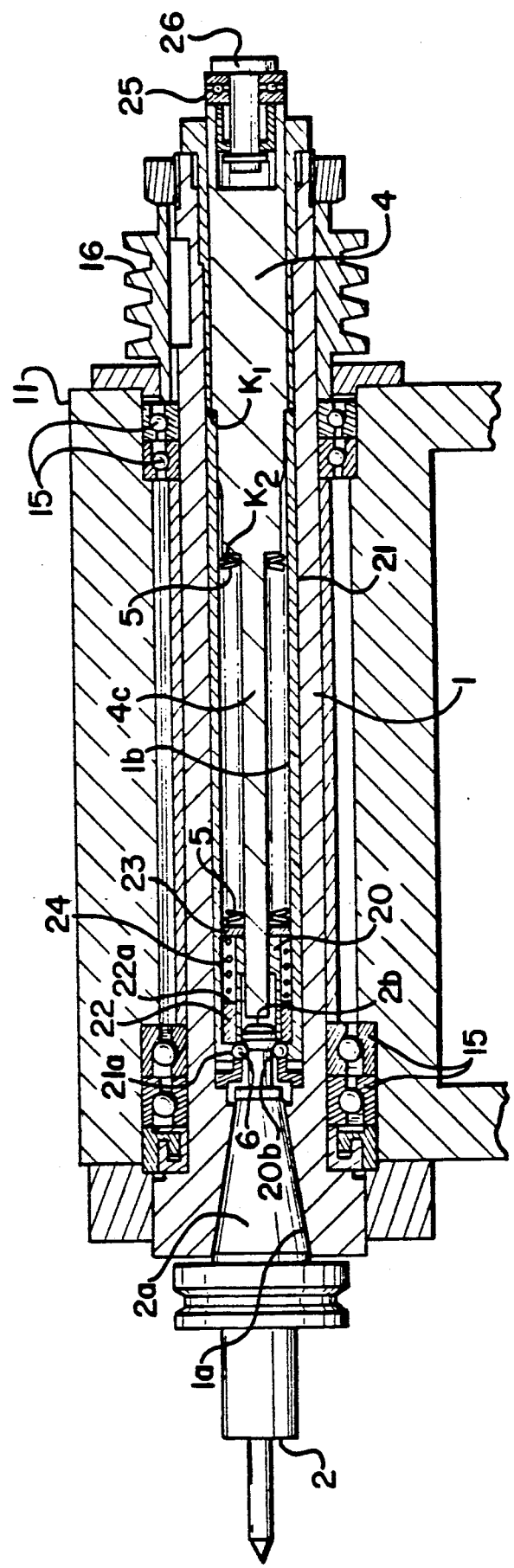
FIG. IA

SPINDLE UNIT OF A MACHINE TOOL IN WHICH TOOLS CHANGING IS AVAILABLE

BACKGROUND OF THE INVENTION

A tool holder is clamped in the spindle of a machine tool. The structure for clamping the tool holder therein is as shown in FIG. 6.

In this figure, 1 points out a spindle body rotatably supported in the spindle head. A tapered hole 1a into which the tapered section 2a of the tool holder 2 is inserted is formed at the tip end. Thereof, and an operating hole 1b on which a staged portion "m" is formed at the upper part thereof is provided. 3 points out a sleeve which is inserted in the corresponding operating hole 1b and is engaged with at the position of the staged portion "m", and the diameter of the lower portion of the inner hole 3a thereof is set to a larger value than that of the upper portion thereof. And a draw bar 4 is pulled upwards by elongation force of a coned disk spring 5 and is so arranged that it can be displaced downwards. The lower end 4a thereof is provided with a cylindrical hole 4c, and a plurality of through holes 4b are provided in the direction of radius with a proper interval in the inward direction at the inlet side thereof. Balls 6 are inserted in the through holes 4b and are so composed that they can engage with the pull stud 2b of the tool holder 2.

In such a structure as shown in the above, when clamping the tool holder 2, the draw bar 4 is displaced toward the downward direction as shown with an imaginary line "n" in the figure against the elongation force of the coned disk spring 5. Under this condition, the tool holder 2 is inserted from downwards toward inwards of the tapered hole 1a of the spindle 1, thereby causing the pull stud 2b of the tool holder 2 to arrive at the solid line position in the figure, excluding the ball 6 outwards of the through holes 4b. Thereafter, the draw bar 4 is made free and is displaced upwards by elongation force of the coned disk spring 5, thereby causing the ball 6 to move inwardly in the through holes 4b with the outer surface thereof guided in the inner hole 3a of the sleeve 3 and to reach the solid line position in the figure where the pull stud 2b is engaged and fixed. Thereafter, this condition is continuously maintained.

To the contrary, when unclamping the tool holder 2, the draw bar 4 is displaced toward the downward direction as shown with an imaginary line "n" in the figure against the elongation force of the coned disk spring 5 as mentioned above, thereby causing the tool holder 2 to be released.

In order to acquire a strong force by the conventional structure, it is necessary to increase the elongation force of the coned disk spring 5 according to the increment of the clamping force.

However, increasing the elongation force of the coned disk spring 5 results in increase of the operating force of the draw bar 4 when clamping and unclamping the tool holder 2, and increase of the corresponding operating force further derives a new problem, that is, increase of the thrust of bearings by which the spindle 1 is supported.

Under such a circumstance, a spindle structure by which the tool holder 2 is strongly clamped to the spindle 1 without excessively increasing the elongation force of the coned disk spring 5 is much desired.

Also, if the draw bar 4 is displaced downwards in order to unclamp the tool holder 2 with the conventional structure, the tool holder 2 is naturally dropped from the spindle 1 by gravity action. For this reason, there is a limitation in use, that is, it is not possible to clamp and unclamp the draw bar 4 unless the tool holder is securely grasped by the tool holder holding mechanism of the tool change arm when changing tools by means of an automatic tool changer, thereby causing such a problem as tools can not be quickly changed, to occur.

OBJECT OF THE INVENTION

The present invention attempts to solve the above problems, and it is therefore an object of the invention to provide a spindle unit by which high precision machining can be made possible by making the clamping force of a tool holder secure and tight without excessively increasing the energy force of the coned disk spring. Also, not excessively increasing the energy force of the coned disk spring can bring easy operation of unclamping and can avoid action of excessive thrust to the bearings of the spindle.

In addition, this spindle unit can prevent a tool holder from dropping from the holder fixing spindle even when the tool change arm does not hold the tool holder in the tool change work, thereby causing the tool holder to be timely clamped and unclamped and the tool change work to be quickly carried out.

Furthermore, as it is possible to clamp and unclamp the tool holder even before the holder fixing spindle stops its revolution completely, a quick tool change work can be much more promoted. These and other objects of the invention will be made apparent in the ensuing description with reference to the drawings attached herewith.

BRIEF DESCRIPTION OF THE DRAWINGS

FIG. 1A is a longitudinal sectional view of a spindle unit for fixing a tool.

DETAILED DESCRIPTION OF THE PREFERRED EMBODIMENTS

Figure 1B:
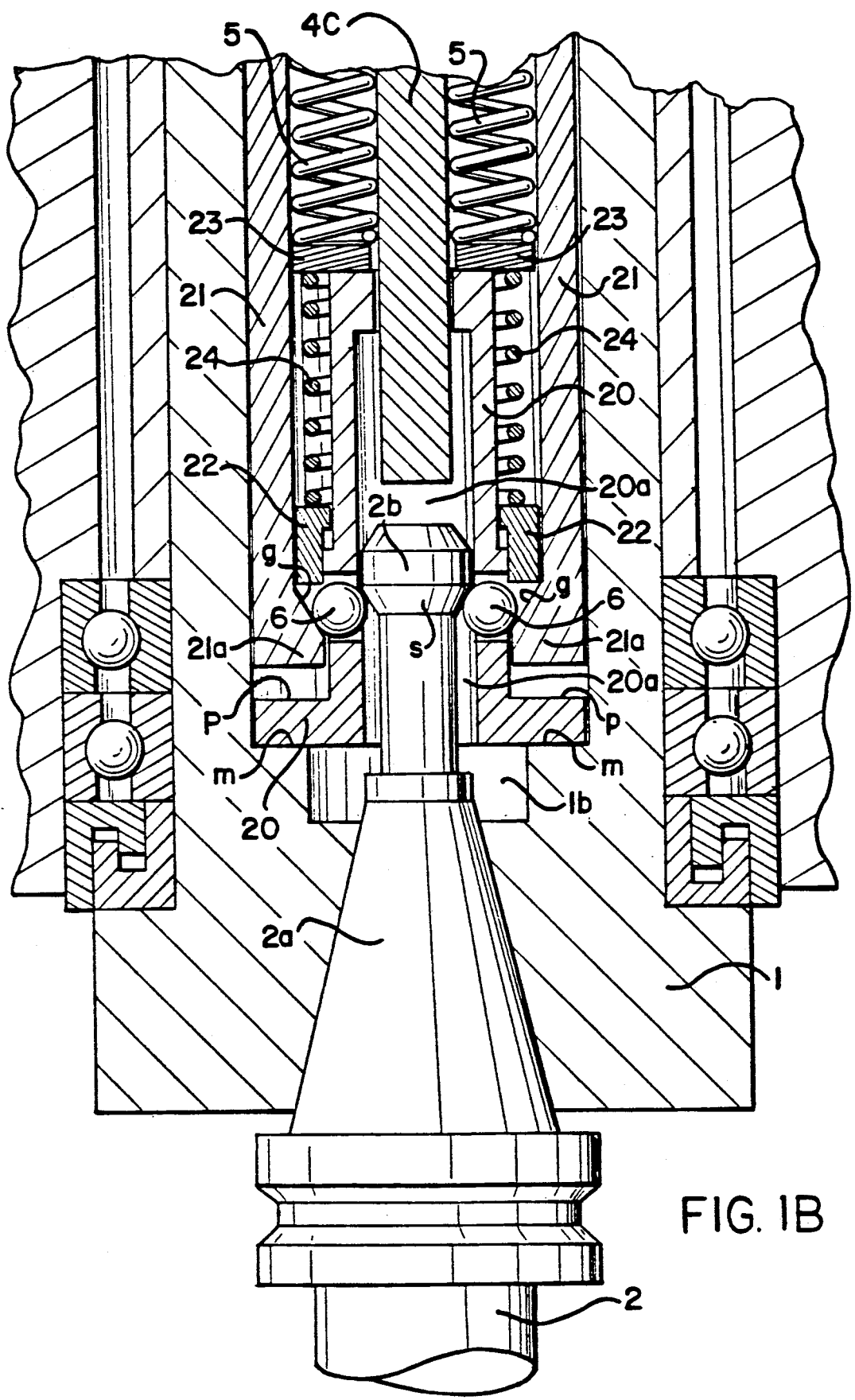
FIG. 1B shows an enlarged detailed view of an important part thereof.

In each of the drawings, a table 7 moves longitudinally and laterally on the base 8 of a machining center. A column 9 stands on the base 8 and is provided with guide rails 10 and 10 at the front side thereof. Then, the tool holder fixing spindle 1 is vertically slidably supported by way of the corresponding guide rails 10 and 10.

A spindle head feeding motor 12 is fixed on the surface of the column 9, and the main drive shaft 12a thereof is linked with a screw shaft 13 and a nut member 14 fixed at the spindle head 11 is screwed to the corresponding screw shaft 13, thereby causing the spindle head 11 to be vertically displaced by rotation of the main drive shaft 12a.

And the spindle 1 is rotatably supported at the spindle head 11 in the longitudinal direction by way of bearings 15 and 15. A drive pulley 16 is fixed at the upper part of the spindle 1. To the contrary, the spindle motor 17 is fixed at the spindle head 11. At the same time, a drive pulley 18 is fixed to the main drive shaft 17a thereof, and a power transmission belt 19 are attached to the corresponding pulleys 18 and 16, thereby causing the spindle 1 to rotate by rotation of the main drive shaft 12a. Moreover, an operating hole 1b is provided along with the center axis line of the spindle 1 therein, and a staged portion "b" is formed at the lower tip end portion of the corresponding operating hole 1b and a tapered hole 1a is formed downwards thereof, into which the tapered portion 2a of the tool holder 2 is inserted. Besides, a draw bar 4 is so inserted inwardly of the corresponding operating hole 1b that it can be vertically slidably displaced in a certain range.

Next, the ensuing description explains the internal structure of the spindle 1.

A sleeve 20 having a protrusion flange p formed outwards at the circumferential part of the lower end portion is inserted into the staged portion "m" formed at the lower end portion of the operating hole 1b. At this time, the inner opening 20a of the sleeve 20 is set to such a dimension as the pull stud 2b of the tool holder 2 can be inserted and a plurality of through holes 20b are made in the direction of radius at a position a little upwards of the protrusion flange "p".

The inner opening 20a of the sleeve 20 is so composed as the pull stud 2b can be inserted and the lower surface part of the expansion portion "S" is engaged with the sleeve 20 by way of a ball 6 inserted in the through hole 20b of the sleeve 20, in order to prevent the pull stud 2b from dropping. At this time, the opposite side of the ball 6 is so positioned that it can be brought into contact with the wedge body 21a of the cylindrical body 21 inserted in the inner opening 1b of the spindle 1. Concretely speaking, the cylindrical body 21 is axially mounted from under a staged portion $K_1$ of the draw bar 4, and the lower end portion of the corresponding body 21 is formed to be a wedge body 21a having L-shaped section faced inwardly and forms an inclination face "g" expanding upwards on the inner circumferential face of the corresponding cylindrical body 21. Then, the wedge body 21a of the corresponding cylindrical body 21 receives repulsion force of the coned disk spring by way of a ring 23, a spring 24, and a sleeve 22. Thus, the repulsion force of the spring is smaller than that of the coned disk spring.

The lower portion of the draw bar 4 is formed to be a slender rod 4c which is narrowed at two staged portions $K_1$ and $K_2$ and the coned disk spring 5 is so provided as to cover the slender rod 4c under the staged portion $K_2$. At this time, the upper end of the coned disk spring 5 is brought into contact with the staged portion $K_2$ of the slender rod 4c, and the lower end thereof is brought into contact with a ring 23 provided at the upper surface of the sleeve 20. Thereby, the repulsion force of the coned disk spring 5 operates directly on the sleeve 20 and does on the wedge body 21a of the cylindrical body 21 by way of a spring 24 and another sleeve 22. Also, the lower end of the slender rod 4c of the draw bar 4 passes through the ring 23 and the sleeve 20 and is inserted into the inner opening 20a of the sleeve 20. And as force operating upwards is given to the draw bar 4 by the repulsion force of the coned disk spring 5, the lower end of the slender rod 4c is in non contact with the expansion portion "S" of the pull stud 2b, leaving suitable space between them.

Also, an unclamp bracket 26 is rotatably attached to the upper end of the draw bar 4 by means of bearing 25, thereby causing a push-down force to operate on the upper surface of the corresponding unclamp bracket 26 even while the spindle 1 is in revolution.

Next, a bending type lever 27 is used for vertically moving the draw bar 4 and is axially fixed to the supporting arm 28 which stands from the spindle head, by way of an axis 29. One end of the lever 27 is axially provided with a push bolt 30 and the other end thereof is axially provided with a roller 31. At this time, a stopper 32 stands on the upper surface of the spindle head 11 which is downwards of the lever 27. At the same time, pushing means 34 by a spring 33 is secured at the position opposite to the corresponding stopper 32 between the lever 27 and the spindle head 27, thereby causing the lever 27 which is free to be brought into contact with the stopper 32 and to be maintained at a fixed position. On the other hand, a cam plate 35 is so fixed at the column 9 that it can move and be vertically adjusted. If the spindle head 11 goes upwards more than a fixed height beyond the area of machining, the inclined cam face 35a which is formed on the cam plate 35 pushes and moves the roller 31 only by a fixed distance in an almost horizontal direction. In accompanying therewith, the push bolt 30 pushes down the unclamp force bracket 26 only by a fixed distance.

Also, the tool change arm 36 is fixed at the rotary shaft 38 of the automatic tool changer 37 and a magazine equipment 39 is for accommodating spare tools integral with tool holders 2 thereof.

Next, the ensuing description explains the action for changing tools, using the unit of such a structure as shown in the above.

Figure 2:
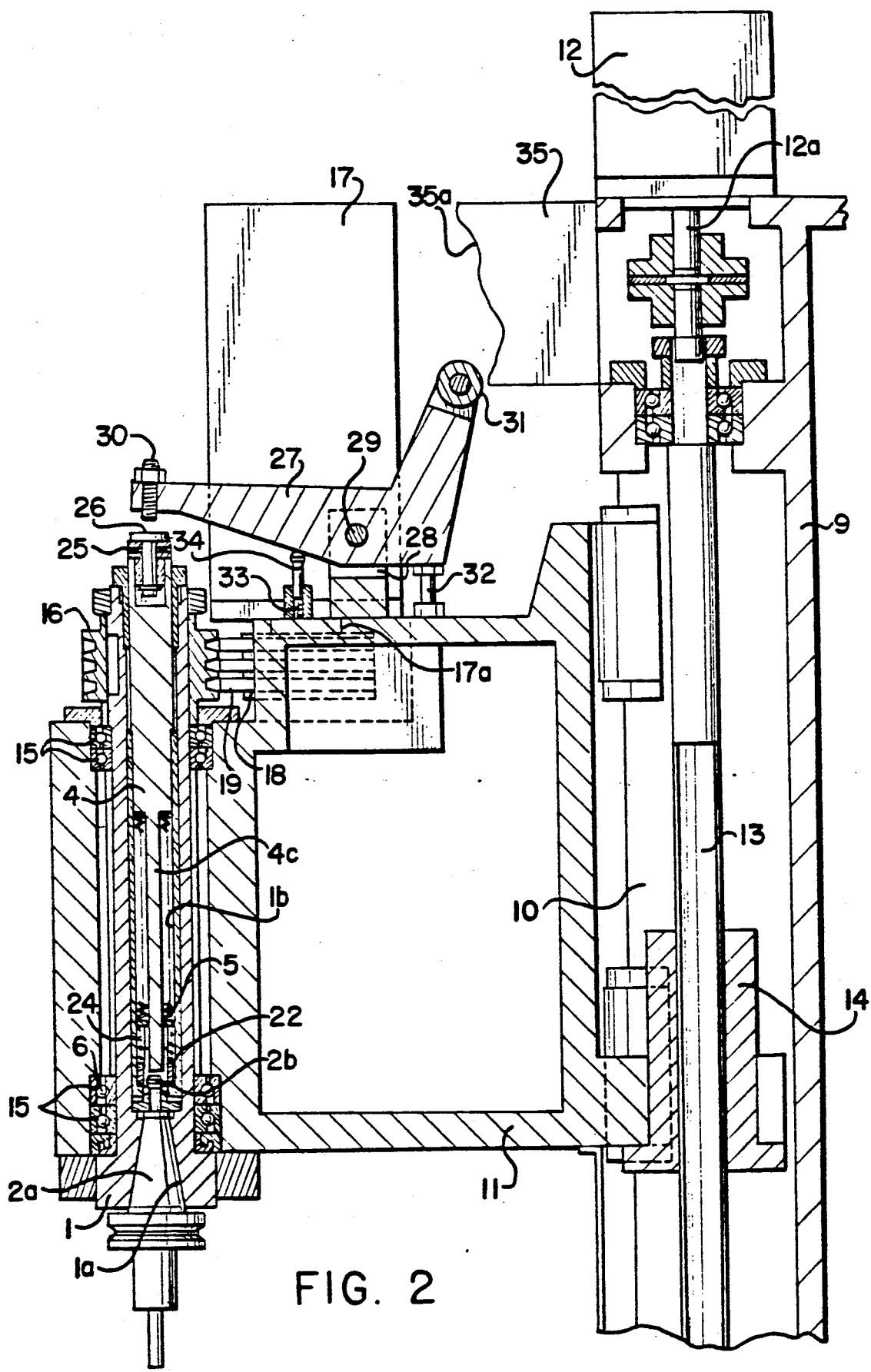
FIG. 2 is a longitudinal sectional view of a machining center including the head portion thereof.
Figure 3:
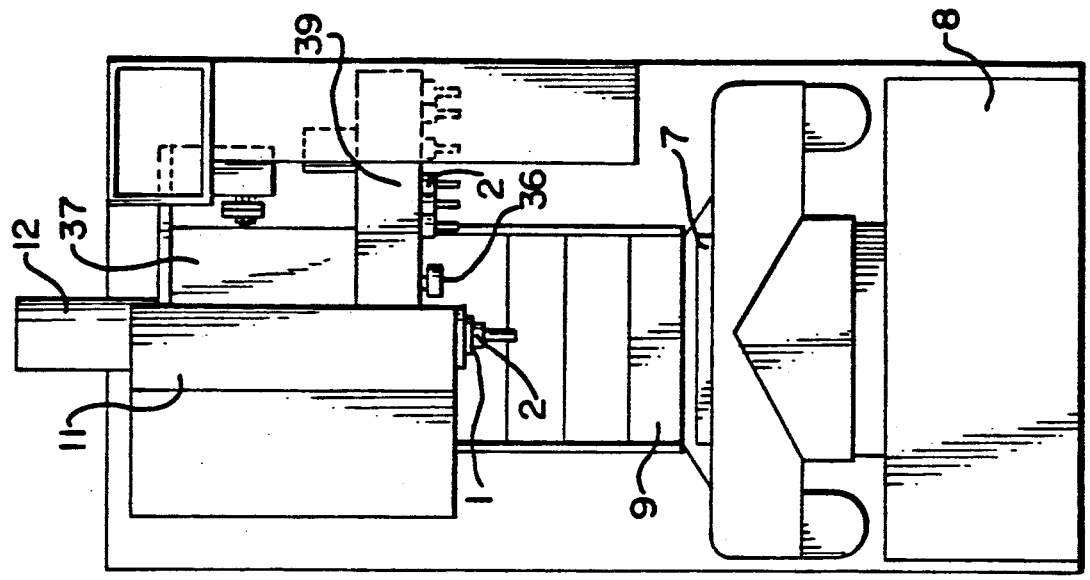
FIG. 3 is the plan view of the same machining center.
Figure 4:
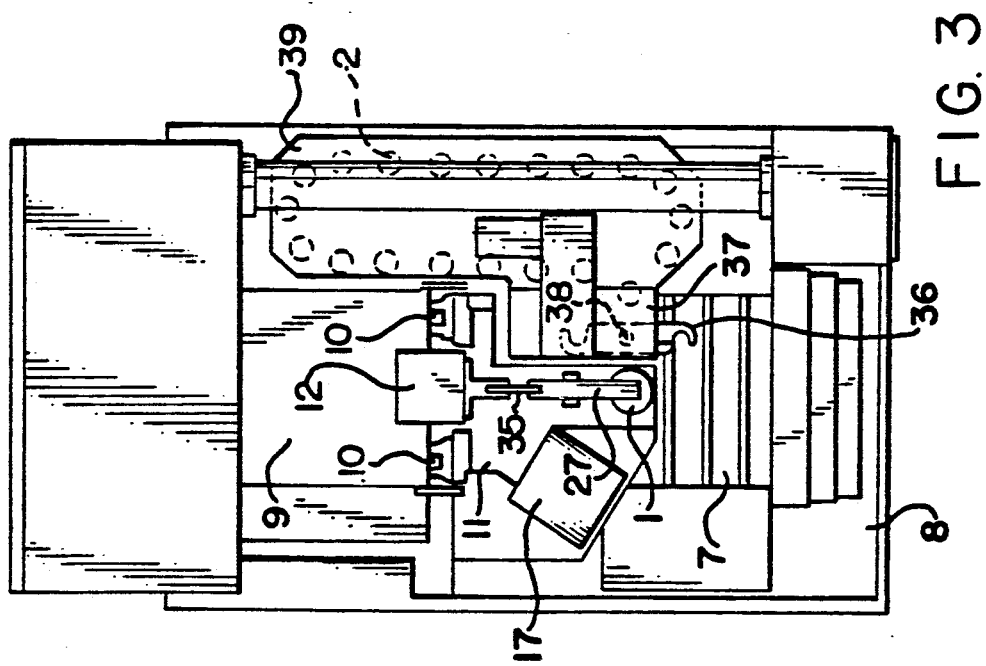
FIG. 4 is the front elevation view of the same machining center, FIGS. 5 A and B are an explanation view showing the tool fixing operation.
Figure 5A:
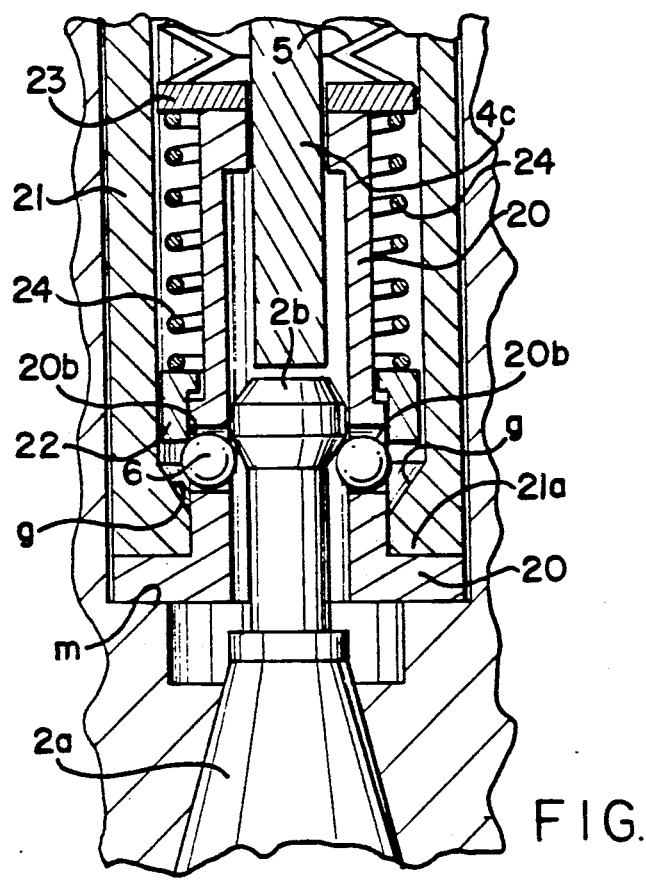

In machining, the spindle 1 clamps the tool holder 2 at such a condition as shown in FIG. 1 and FIG. 2. However, when changing tools, the spindle head 11 is displaced upwards from the area of machining and the roller 31 of the lever 27 is brought into contact with the cam plate 35 before reaching the tool changing position, thereby causing the draw bar 4 to be pushed down and displaced by vibrations of the lever 27. At this time, as the unclamp force bracket 26 can rotate even though the rotation of the spindle 1 does not come to a complete stop, the draw bar 4 can be pushed down and displaced with any hindrance. And as the draw bar 4 is displaced downwards, the inclination face "g" of the wedge body 21a of the cylindrical body 21 which pushes the outside of the ball 6 is released from the ball 6, thereby causing the positional restriction of the ball 6 to be released. Therefore, the tool holder 2 can be unclamped. (See FIG. 5A). But as the lower end of the sleeve 22 pushes the ball 6 inwardly of the through holes 20 by virtue of the energy force of the spring 24 even under this condition, the pull stud 2b can maintain its controlled and engaged condition by the ball 6, thereby causing the tool holder 2 not to drop by the gravity thereof.

Figure 5B:
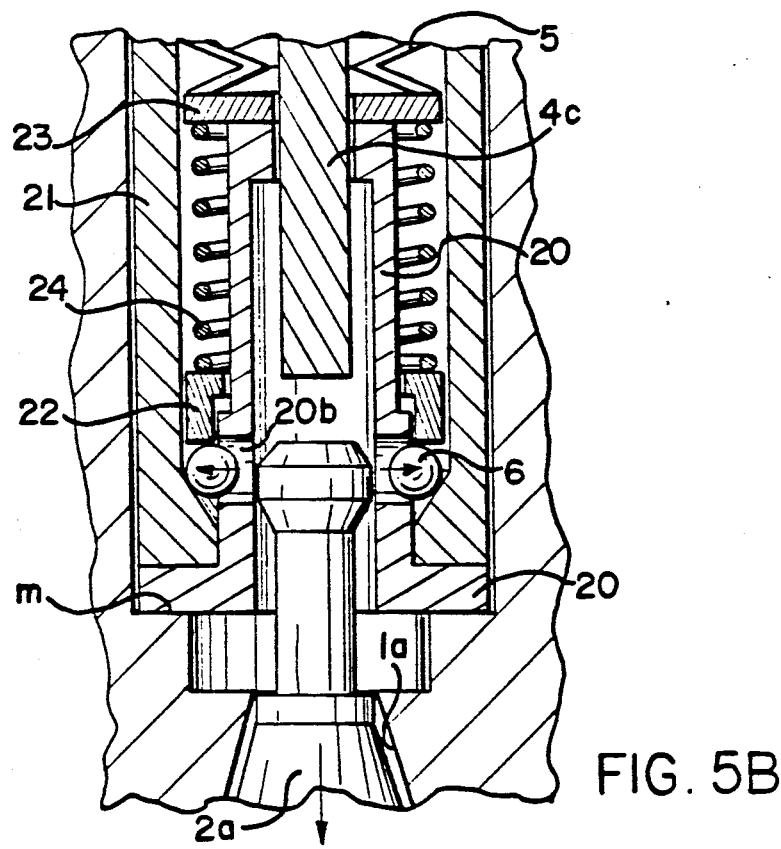
Figure 6:
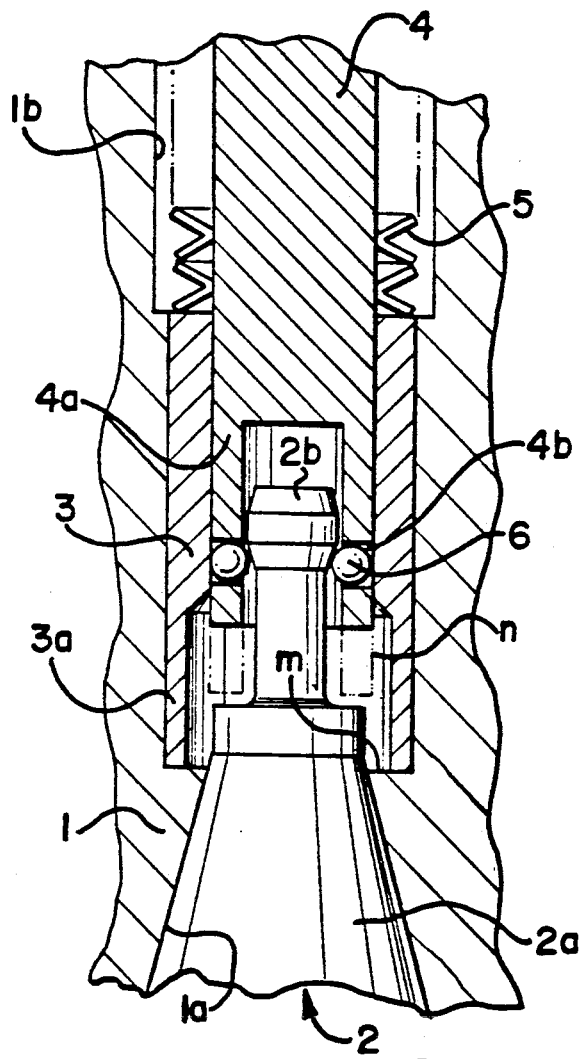
FIG. 6 is an explanation view showing a part of the conventional spindle unit.

As the spindle head 11 completely reaches the tool change position, the tool change arm 36 turns by 90 degrees around the axis 38 and holds the tool holder 2 at one end grasping portion. At the same time, the tool change arm 36 immediately comes down. Thereby the tool holder 2 is pulled downwards. At this time, the pull stud 2b pushes the ball out of the through hole 20 against the energy force of the spring 24 and the tool holder 2 can be carried out without any hindrance. (See FIG. 5 B). In comparison with the conventional structure in which the tool holder 2 can be unclamped only after the tool change arm 36 holds the tool holder 2, this system disclosed by the present invention can remarkably shorten the tool changing time.

Thereafter, the tool change arm 36 turns by 180° around the axis 38 and locates the tool holder 2 in which a tool to be used next is fixed, right below the spindle 1 for the other end holding portion of the arm 36. Then, the tool change arm 36 elevates the tool holder 2 and insert the corresponding tool holder 2 in the tapered hole 1a of the spindle 1 up to a fixed position. Thereby the pull stud 2b can be repulsively inserted in the inner opening 20a of the sleeve 20, letting the unclamped ball 6 escape outwardly of the through hole 20b against the energy force of the spring 24. Right thereafter, the tool change arm 36 turns reversely by 90° to release the tool holder 2 and returns to the original position thereof. However, as the ball 6 is given the energy force which actuates inwardly of the through holes 20b by the spring 24 and the sleeve 22, as well as mentioned above, engagement of the pull stud 2b can be maintained, thereby causing the tool holder 2 not to drop from the tapered hole 1a of the spindle 1. This also contributes to remarkably shortening the tool change time in comparison with the conventional system in which the tool holder 2 can be unclamped only after the tool change arm 36 holds the tool holder 2, as well as in the above description. And after the tool change arm 36 returns to the original position thereof, the spindle head 11 is lowered to the area of machining again. In the meanwhile, as the roller 31 comes off from the cam plate 35, the lever 27 is made free to cause the draw bar 4 to be released. Thereby the draw bar 4 moves upwards by repulsion force of the coned disk spring 5 and the inclination face "g" of the wedge body 21a forcedly moves the ball 6 inwardly of the through hole 20b. At this time, the inclination face "g" of the wedge body 21a receives a force of the coned disk spring 5 and forcedly moves the ball 6 inwardly of the through hole 20b, thereby causing the ball 6 to be tightly pushed to the lower inclined face of the expansion portion of the pull stud 2b. For this reason, the tool holder 2 is strongly pulled in the tapered hole 1a and is securely and tightly clamped. Thereafter, the spindle 1 is driven and rotate for machining.

According to the present invention, as the clamping force of the tool holder is made secure and strong by the wedging action of the inclination face of the wedge body formed at the lower end of the draw bar, highly precision machining can be permitted. This system does not need any increase of the repulsion force of the coned disk spring unlike the conventional structure. Therefore, the operating force for unclamping can be decreased, and it is possible to avoid that excessive thrust operates on the bearings of the spindle.

Even when the tool change arm does not hold the tool holder in the tool changing work, it is possible to prevent the tool holder from coming off from the holding fixing spindle and timely to clamp and unclamp the tool holder, thereby causing the tool changing work to be quickly carried out.

Furthermore, as it is possible to clamp and unclamp the tool holder under such a condition that the holder fixing spindle does not come to a complete stop, the tool changing work can be carried out very quickly.

What is claimed is:

1. A spindle unit of a machine tool in which tool changing is available, comprising:
    (a) bearing means;
    (b) a spindle having a spindle head and rotatably supported by said bearing means for fixing a tool holder at said spindle head, said spindle having an operating aperture along the center line thereof having a lower tip end portion;
    (c) a staged portion at said lower tip end portion of said operating aperture;
    (d) a tapered aperture disposed below said staged portion, a tapered portion of said tool being inserted into said tapered aperture;
    (e) a sleeve having a flange protruding outwardly from a circumferential point of said lower tip end portion inserted in said operating aperture for the staged portion at the lower tip end portion; and
    (f) a plurality of through apertures with balls inserted in the direction of a radius at a point upward of said protruded flange of said sleeve, characterized in that:
    (g) a draw bar having a lower part in the form of a slender rod narrowed at first and second staged portions, the tip end of the slender rod inserted a fixed distance into the upper part of an inner opening of the sleeve, a coned disk spring surrounding the slender rod under the second staged portion, and the draw bar upon which repulsion acts by pushing the sleeve toward the staged portion via the coned disc spring.
    (h) a cylindrical body axially provided under the first staged portion of the draw bar, the lower end of the cylinder body being longer than the tip end of the slender rod, having an inwardly faced wedge body with an L-shaped section, and an inclination face extending upward on an inner circumferential face of the wedge body and acting as a receiving face of the ball which is inserted in the through hole of the sleeve,
    (i) a spring provided between the outer circumference of the sleeve and the cylindrical body with the upper end of the spring connected to the lower end of the coned disk spring by a ring and the lower end of the spring connected by a sleeve to the ball, said ball inserted in the through hole of the sleeve, and the spring exerting less repulsion than the coned disk spring.

2. The spindle unit of a machine tool of claim 1 further comprising an unclamp receiving bracket rotatably provided at the upper end of the draw bar in said bearing.

* * * * *